United States Patent [19]

Zendle et al.

[11] 3,869,648

[45] Mar. 4, 1975

[54] SUPPRESSOR OF FAST HIGH POWER ELECTRICAL TRANSIENTS

[75] Inventors: Bernard Zendle, Adelphi; Marcella C. Petree, Silver Spring, both of Md.

[73] Assignee: The United States of America as represented by the Secretary of the Navy, Washington, D.C.

[22] Filed: Oct. 19, 1973

[21] Appl. No.: 408,246

[52] U.S. Cl. ..................................... 317/16, 317/31

[51] Int. Cl. ............................................. H02h 3/20

[58] Field of Search ................................ 317/16, 31

[56] References Cited

UNITED STATES PATENTS 3,648,110 3/1972 Knight ................................. 317/16

OTHER PUBLICATIONS

Silicon Zener Diode and Rectifier Handbook, "High Frequency and Switching Considerations," 9/64, p. 23,24.

*Primary Examiner*—James D. Trammell

*Attorney, Agent, or Firm*—R. S. Sciascia; J. A. Cooke; W. W. Cochran

[57] ABSTRACT

This invention relates to two embodiments for protecting sensitive electrical devices from fast, high power transients. One embodiment utilizes a Shockley diode and the other an SCR, both being light activated.

7 Claims, 2 Drawing Figures

SUPPRESSOR OF FAST HIGH POWER ELECTRICAL TRANSIENTS

BACKGROUND OF THE INVENTION

The present invention relates generally to electrical protection systems and move specifically to a suppressor for protecting sensitive electrical equipment such as receivers from fast high power transients induced upon an antenna by an electro-magnetic pulse from a nuclear explosion. The prior systems have all been limited with respect to either their speed of response, current or voltage handling capability, energy drain, or some combination of the foregoing limitations. Basically, the prior systems can be broken down into three categories. The first category, lightening arrestors, have been found to have a response which is too slow. Generally, lightening strokes have a much longer duration than a nuclear produced EMP. As result, the high power transients damage the receiver before the lightening arrestor can have any protective effect.

The second category, consisting of spark gap devices has the disadvantage of protecting a receiver input only from relatively high voltages. Normally, the voltage on a spark gap must build up to a relatively high threshold level before it will discharge to a ground potential and thereby protect the receiver input. However, many receivers cannot withstand this threshold voltage level and consequently will be damaged before the spark gap takes effect.

The third category of protective devices consists of a zener diode connected between the input line and ground. Whenever the voltage on the input line rises above the zener voltage, the zener diode becomes conductive and shorts this additional potential to ground. One of the primary advantages of the zener diode is its fast reaction time. The zener diodes, however, have an inherent capacitance associated with their structure. Accordingly, zeners connected in this manner cause a low impedance drain on high frequency input signals ultimately rendering the zeners useless above a certain band of frequencies. Although various clipping circuits have been devised to reduce this inherent capacitance, i.e., series connected signal diodes, they often lack the power handling capability necessary to operate the receivers.

SUMMARY OF THE INVENTION

The present invention overcomes these disadvantages and limitations by providing a circuit which utilizes the light energy emitted from a spark gap to turn on a light responsive semiconductor device. The semiconductor device is coupled to a ground potential so that when the semiconductor is turned on by a pulse strong enough to activate the spark gap, the entire signal will be shorted to ground.

A delay line is utilized between the light responsive semiconductor device and the spark gap to compensate for the turn-on time of the semiconductor. A zener, in parallel with a capacitor, is connected to the semiconductor and ground so that the capacitor will charge to the zener voltage and turn off the light responsive semiconductor.

It is therefore the object of the invention to provide a new and improved device for suppressing fast high power electrical transients.

It is also an object of the invention to provide a transient suppressor which has a fast response.

Another object of the invention is to provide a transient suppressor for protection of sensitive low signal input receivers.

Another object of the invention is to provide a transient suppressor operable at very high frequencies.

Another object of the invention is to provide a transient suppressor with a high power handling capability.

Other objects, advantages and novel features of the invention will become apparent from the following detailed description of the invention when considered in conjunction with the accompanying drawings wherein:

DETAILED DESCRIPTION OF THE PREFERRED EMBODIMENT

Figure 1:
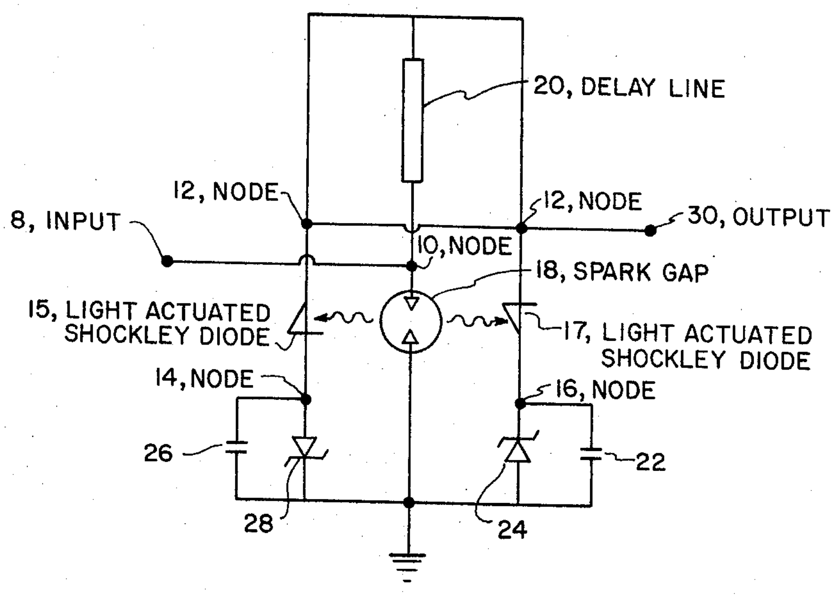
FIG. 1 shows the preferred embodiment utilizing a light activated shockley diode.

FIG. 1 shows the transient suppressor constituting the preferred embodiment which is to be used preferably between an antenna and a receiver to protect the receiver from possible damaging effects of fast, high power transients such as those produced by a transient electromagnetic field of radiation. The signal is received from the antenna via input 8. Under normal conditions the signal is transmitted from node 10 through the delay line 20 to node 12 constituting output 30 which is connected to the receiver. Whenever a transient potential is applied to the input 8 causing spark gap 18 to break down, most of the incoming transient is discharged to ground with some of the energy converted into light distributed in the wave length from 0.3 to 1.2 microns and the remaining energy producing a residual voltage transient. Some of this light is coupled to the light activated shockley diodes (LASD's) 15 and 16 which are arranged in parallel opposed relationship between node 12 and nodes 14 and 16, respectively to facilitate suppression of positive or negative transients. By flooding the LASD's 15 and 17 with optical radiation, current carriers are produced within the semiconductor structure enabling the LASD's 15 and 17 to switch conduction state from "off" to "on" as the transient arrives at node 12.

Since the rated turn on times of the LASD's may not be short enough for them to switch conduction state during the presence of a fast transient, a delay line 20 is used between nodes 10 and 12 to delay the arrival time of the residual voltage transient after spark gap discharge. Of course, the delay is selected such that current carrier population is established at a level which will allow LASD's 15 and 17 to switch simultaneously with the residual voltage for the transients. In this manner, the LASD's have effective turn-on times which are virtually zero thereby protecting the receiver from the fastest transients limited only by the delay interval.

Zener diodes 24 and 28 determine the voltage level to which the capacitors 22 and 26 charge, whenever LASD's 17 or 15 turn on, respectively, depending on the transient polarity. After the capacitors charge they act as a reverse bias on the LASD's to turn them off after the transients below the zener voltage. The capacitors 22 and 26 may not be required if the zener junction capacity and the circuit parasitic capacity are sufficient.

Figure 2:
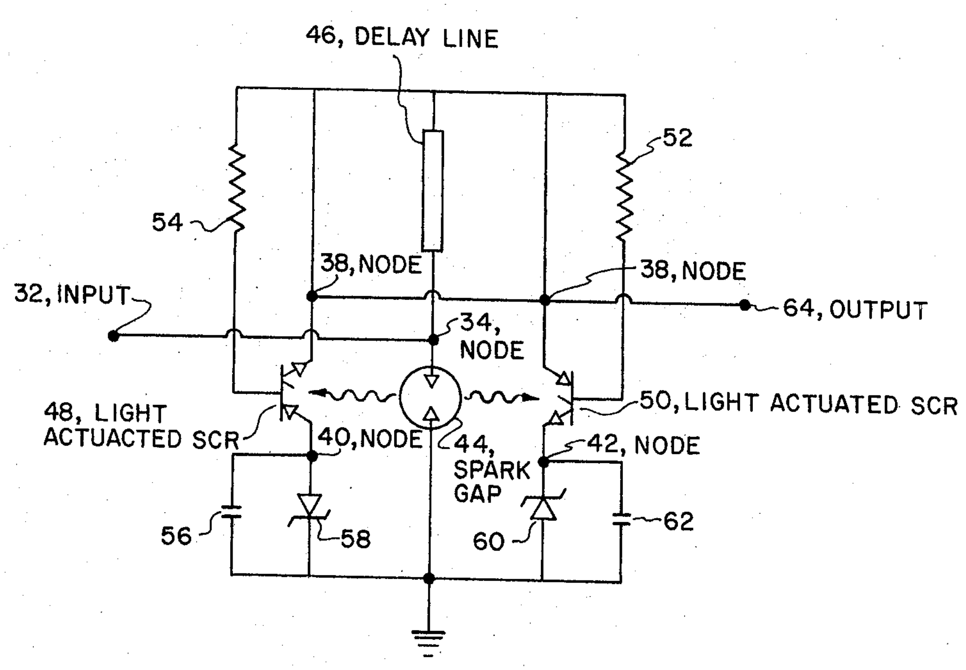
FIG. 2 shows an alternative embodiment utilizing a light activated silicion controlled rectifier.

FIG. 2 shows an alternative embodiment utilizing light activated silicon control rectifiers (LASCR's) 48 and 50 in place of the LASD's 15 and 17 of FIG. 1. Resistors 52 and 54 are additionally connected in an external manner in this device whereas they are effectively internally connected in FIG. 1 due to the structure of the LASD's. In all other respects, the alternate version of FIG. 2 operates in the same manner as the device of FIG. 1.

The advantage of the present invention is that it combines the properties of fast reaction time, wide voltage range protection, and light loading. Notably, the response time is on the order of 10 nano-seconds or less with a protection capability of 50,000 volts at 1000 amperes to a source impedance of 50 Ohms. The impedance of the system to ground is extremely high thereby offering very light loading to even low input high frequency input signals.

Obviously many modifications and variations of the present invention are possible in light of the above teachings. For instance, this device need not be used exclusively with a receiver, but any sensitive electrical circuitry which must be protected. It is therefore to be understood that within the scope of the appended claims the invention may be practiced otherwise than as specifically described.

What is claimed is:

1. A circuit for suppressing transient signals between an input and an output comprising:

a spark gap connected between said input and a ground potential;

means for delaying said transients signals connected between said input and said output;

light activated semiconductor means connected to said output and physically positioned to accept light produced by said spark gap for conducting said transient signals which produce a forward bias across said light activated semiconductor means to said ground potential whenever said transient signals have sufficient magnitude to activate said spark gap;

means connected between said light activated semiconductor means and said ground potential for producing a predetermined reverse bias level on said light activated semiconductor means to cause said light activated semiconductor means to insulate said transient signals from said ground potential until the magnitude of said transient signals falls below said predetermined reverse bias level.

2. The circuit of claim 1 wherein said light activated semiconductor means comprises at least one light activated shockley diode.

3. The circuit of claim 1 wherein said light activated semiconductor means comprises at least one light activated silicon controlled rectifier.

4. The circuit of claim 2 comprising two light activated semiconductor devices arranged in a parallel opposed relationship for protection from both positive and negative transients.

5. The circuit of claim 3 comprising two light activated semiconductor devices arranged in a parallel opposed relationship for protection of both positive and negative transients.

6. The circuit of claim 1 wherein said means connected to said light activated semiconductor comprises a zener diode connected in parallel with a capacitor.

7. The device of claim 4 wherein said means connected between said light activated semiconductor means comprises a zener diode connected in parallel with a capacitor.

* * * * *